United States Patent [19]
Foulquier et al.

[11] Patent Number: 5,435,785
[45] Date of Patent: Jul. 25, 1995

[54] ELASTING COUPLING UNIT ESPECIALLY FOR A VEHICLE STEERING COLUMN

[75] Inventors: Jacques Foulquier, Vendome; Frédéric Gentet, Le Tallud; Olivier Perichon, Vendome, all of France

[73] Assignee: Nacam, France

[21] Appl. No.: 26,283

[22] Filed: Mar. 4, 1993

[30] Foreign Application Priority Data

Mar. 6, 1992 [FR] France ............... 92 02745

[51] Int. Cl.⁶ ............................ F16D 3/58
[52] U.S. Cl. ........................ 464/94; 464/92; 464/147
[58] Field of Search ............. 464/92, 147, 93, 94, 464/96, 98; 403/88, 344, 359, 339; 384/220, 221

[56] References Cited

U.S. PATENT DOCUMENTS

| | | | |
|---|---|---|---|
| 2,172,707 | 9/1939 | Julien | 464/93 |
| 3,360,963 | 1/1968 | Turunen | 464/94 |
| 3,684,999 | 8/1972 | LaFramboise | 464/94 |
| 4,011,021 | 3/1977 | Hartz | 464/96 |
| 4,380,442 | 4/1983 | Amsel | 464/93 |
| 4,563,166 | 1/1986 | Walter et al. | 464/96 |
| 4,702,722 | 10/1987 | Narue et al. | 464/93 |
| 4,877,050 | 10/1989 | Harris | 403/344 |
| 4,984,930 | 1/1991 | Connor | 403/344 |
| 5,052,842 | 10/1991 | Janatka | 403/359 |

FOREIGN PATENT DOCUMENTS

| | | |
|---|---|---|
| 0145572 | 6/1985 | European Pat. Off. . |
| 0430748 | 6/1991 | European Pat. Off. . |
| 866159 | 6/1941 | France . |
| 958635 | 3/1950 | France . |
| 1205789 | 2/1960 | France . |
| 74821 | 1/1961 | France . |
| 9110049.6 | 11/1991 | Germany . |
| 479377 | 2/1938 | United Kingdom . |

*Primary Examiner*—Daniel P. Stodola
*Assistant Examiner*—Eileen A. Dunn
*Attorney, Agent, or Firm*—Burns, Doane, Swecker & Mathis

[57] ABSTRACT

An elastic coupling unit is arranged on an element of a motion transmission assembly. The motion transmission assembly includes at least one cardan joint on one extremity and an input plate and an output plate between which an elastic member is located. The elastic member and the annular face portions of each of the input and output plates are concave in shape so that the elastic member works together with the annular face portion of each plate. The concavity center of these various portions matches the conical rotation center of the assembly and is located on the output plate side of the center.

22 Claims, 3 Drawing Sheets

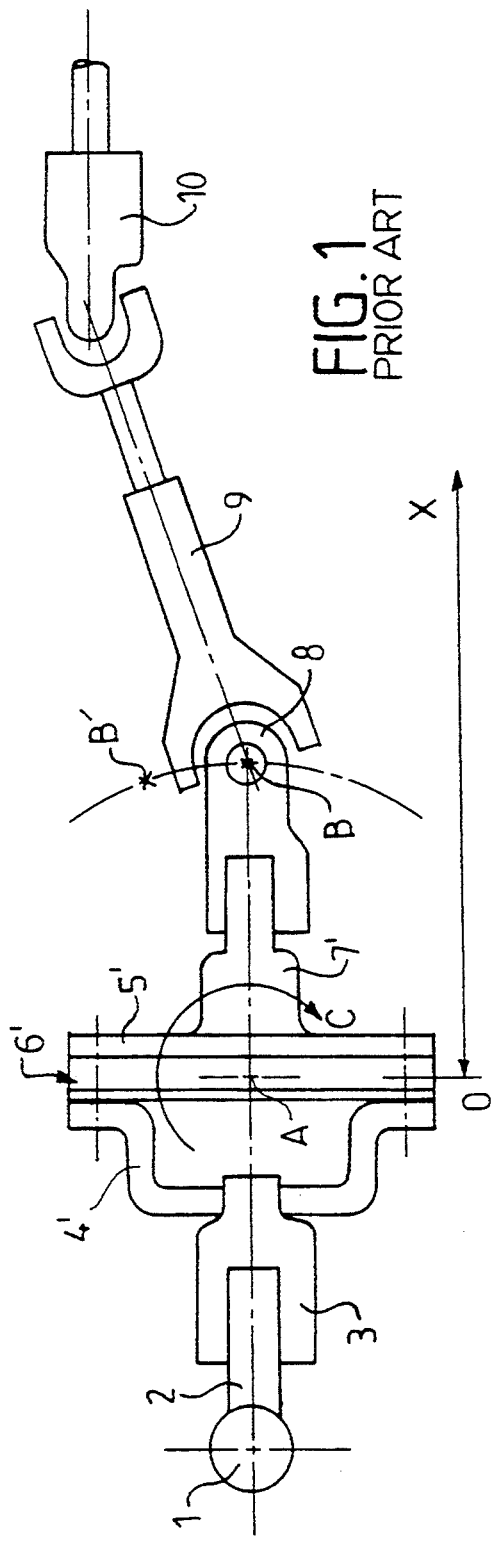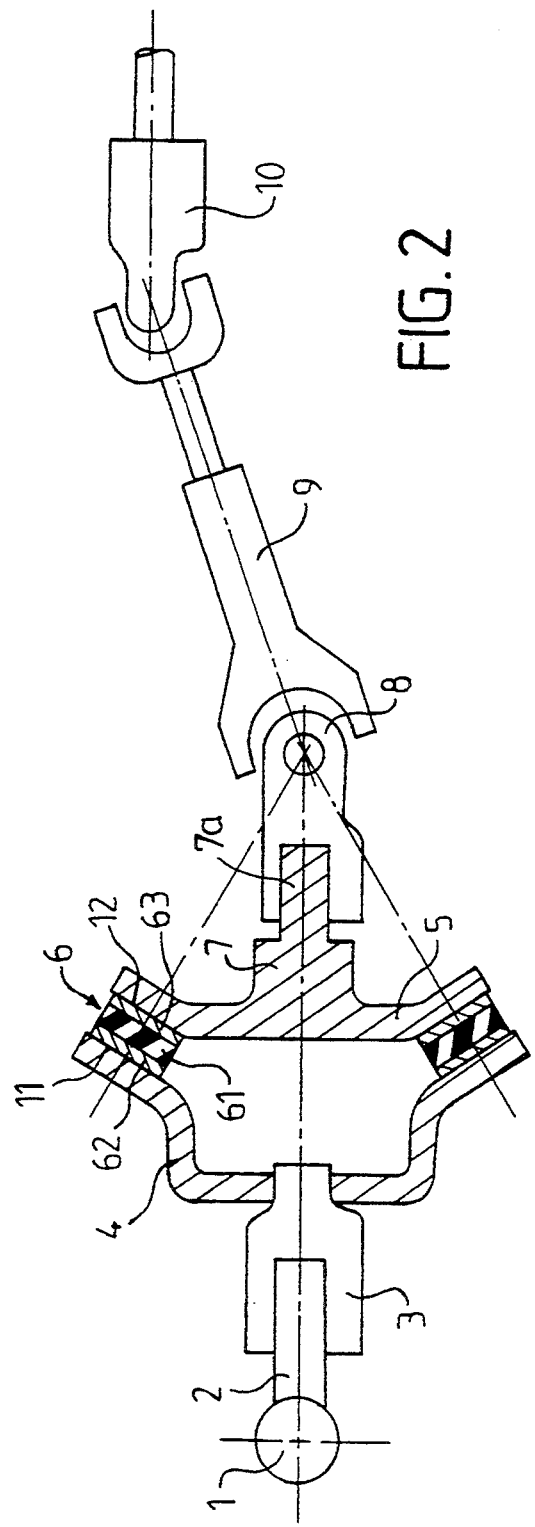

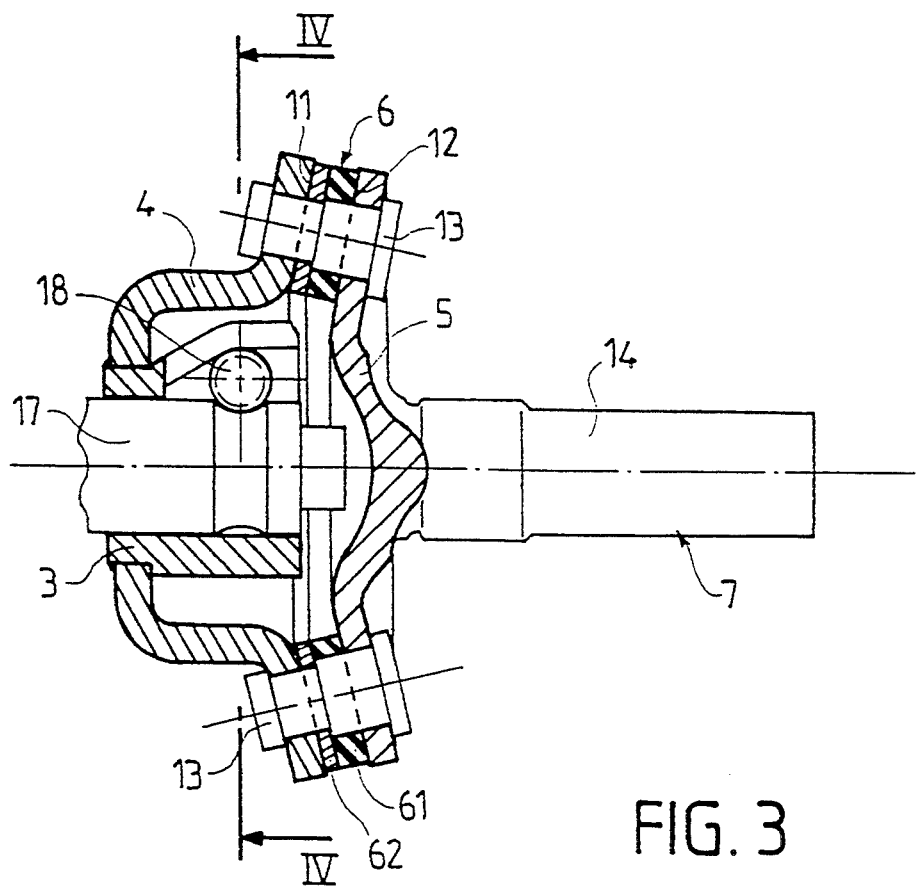

ELASTING COUPLING UNIT ESPECIALLY FOR A VEHICLE STEERING COLUMN

FIELD OF THE INVENTION

This invention relates to an elastic coupling unit arranged on the element of a motion transmission assembly, which includes at least one cardan joint at one of its ends. The elastic coupling unit according to the invention is more especially designed for installation on an automotive vehicle steering column.

BACKGROUND OF THE INVENTION

Automotive vehicle steering columns are well-known which include an elastic coupling unit such at that shown in FIG. 1. This type of steering column connects a steering box to the steering wheel. The steering box comprises a rack 1 and a pinion 2 on which the first element of a transmission assembly is mounted The other end of the steering column is terminated by a cardan joint 8. A second element of this transmission assembly comprises an intermediate axle 9 arranged between the cardan joint 8 and a cardan joint 10. In order to absorb the noises and the vibrations from the steering back-up pump, an elastic coupling unit 6 is mounted on the first element of the transmission assembly, i.e., between the pinion 2 and the cardan joint 8. This elastic coupling unit 6' possesses an input plate 4' and an output plate 5'. The input plate 4' is mounted on a flange 3 which accommodates an extremity of the steering box pinion. The output plate 5 possesses a flange 7' which engages a jaw of the cardan joint 8. In this type of structure, the technology of this transmission element is such that the conical rotation center of the elastic element 6' is located at a point A, approximately on the axis of this transmission element. According to the constitution of the elastic portion 6', this point A may move along the axis and take on a value X, which equals 0 when A located in the middle of the elastic coupling unit, whereas the same value may increase infinitely. Under the effect of the torque transmitted by the driver at the steering wheel, the elastic portion 6' is subjected to an additional torque C around the point A. This additional torque generates a conical defection of the system. This conical deflection causes the B—B' displacement of the cardan joint centre 8, i.e., a rotation centred around the point A with radius AB. This displacement caused by the rotation produces large space requirements for the rotation of the cardan joint 8, which is not compatible with the room available in modern vehicles. Moreover, even if the steering column is arranged so that both cardan joints 8 and 10 have a structure with angles enabling more or less homocentric transmission, the movement along the arc BB' of the center of the carden point at least partially destroys this homocentric assembly.

The supplementary torque which appears depends on the angle described by the cardan joints, i.e., the geometry of the transmission as well as the input torque applied by the driver; and this supplementary torque may reach values in the order of half the torque to be transmitted. The displacement of the cardan joint 8, i.e., of the centre position of its point B to the point B' also depends on the ratio of the lever arms and may reach values relatively high which are inadmissible in modern vehicles. The position of the point A is random and one never knows exactly where it is. Indeed, in case when the disk in elastic material of the elastic coupling unit 6 is very flexible under shearing effect and very stiff under compression, the point A is located towards the infinite, since there can only be displacements in the shearing direction, i.e., in the direction perpendicular to the axis, hence without any rotation movement. On the contrary, when the elastic disk of the elastic coupling unit 6' is very stiff under shearing effect and very flexible under compression, the point A is located in the center of this elastic disk. As we never know exactly the structure nor the precise characteristics of this disk in elastic material, we do not master the position of the point A, and the displacement of the point B is always relatively important. In order to remedy these drawbacks, the well-known solutions tend to increase the conical stiffness and hence the torsional stiffness, which causes the major drawback to .decrease the noise and vibrations absorption capacities for which this coupling unit had been designed initially. Finally, the supplementary torque varies twice per rotation with two points located at maximal value, and two points located at minimal value, both in the same direction. This supplementary torque and its evolution during rotation, destroy the rubber of this elastic coupling unit quite rapidly.

OBJECTS AND SUMMARY

The purpose of the invention is to suggest an elastic coupling unit which avoids drawbacks described previously and which allows an accurate position of the point A in order to avoid any bottoming, while using an elastic portion which enables absorption capacities necessary to filtering noises and vibrations.

According to the invention, the elastic coupling unit is arranged on one element of a motion transmission assembly, which includes at least a cardan joint on one of its ends. The elastic coupling unit includes an input plate and an output plate between. In elastic portion is provided between the input and output plates. The elastic portion and the annular face portions of the input and output plates which are located on opposite sides of the elastic portions are concave in shape. This arrangement is carried out so that this elastic portion works together with the annular face portion of each plate, so that the concavity center of these various parts matches the conical rotation center of the assembly and that this concavity center is located on the output plate side in the area of the cardan joint center.

According to an embodiment of the invention, the peripheral portion of the input plate, the annular face portion of the output plate, and the elastic portion between the annular face portions of the input and output faces, are more or less plane and conical in shape in order to exhibit a concave shape in the concavity center and more or less the conical rotation center of the assembly. According to another embodiment of the invention, the annular face portion of the input plate, the annular face portion of the output plate and the elastic portion have more or less the shape of a spherical section, so that they are concave in the concavity center and more or less the conical rotation centre of the assembly.

The elastic portion may exhibit several structures. According to a first embodiment, the elastic portion solely consists of an elastic material to adhere directly on the internal side of the input plate and on the external side of the output plate. According to a second embodiment, the elastic portion has an element in elastic material to adhere directly on the external side of the output plate and to adhere directly on an intermediate plate which bears against the internal side of the input plate, whereas this intermediate plate is engaged into the input plate using assembly means. According to a third embodiment, the elastic portion has an element in elastic material to adhere directly on the internal side of the input plate and to adhere directly on an intermediate plate which bears against the external side of the output plate, whereas this intermediate plate is engaged into the output plate using assembly means. According to a fourth embodiment, the elastic portion has an element in elastic material to adhere directly to two intermediate plates, which bear against the internal side of the input plate and against the external side of the output plate, respectively, whereas each intermediate plate is engaged into the input plate and into the output plate, respectively, using assembly means. Pot these last three embodiments of the elastic portion, the assembly means consist advantageously of rivets, going through the input plate, the elastic portion and the output plate.

The elastic coupling unit according to the invention may be mounted in an automotive vehicle steering column. With this type of application, the input plate comprises a flange, working together with the steering box pinion, and the output plate comprises a flange which is fitted with a rod working together with the cardan joint jaw.

With this type of application, the input plate flange has preferably the shape of a hub partially split in the axial direction and in an area outside the linking area with the input plate. This slot enables to form both parts of a claw which are blocked against the pinion shaft of the steering box using an assembly screw, secant with this shaft. In order to improve further the characteristics of this assembly, the pinion shaft of the steering box is engaged in rotation with the input plate flange using two flat surfaces which have been arranged on the pinion shaft, and which work together with two conjugated shapes arranged in the flange of the input plate.

The elastic coupling unit according to the invention advantageously determines accurately the position of the conical rotation centre of the assembly, which is preferably located in the center of the cardan joint. Consequently, the rotation center is imposed and the displacement of the cardan joint is almost equal to zero. Thus, the space requirements of the whole assembly in the cardan area are reduced and brought back to the theoretical space requirements. Moreover, non-homocentricity is not increased and remains identical to an assembly which would not have any elastic coupling units. Finally, it is possible, thanks to the structure of this elastic coupling unit to decrease the conical and torsional stiffness down to the value desired, in order to increase the noise and vibration absorption capacities of this elastic element and to meet the specifications of the steering columns on today's care.

BRIEF DESCRIPTION OF DRAWINGS

Other characteristics and advantages of the invention will be underlined by the following description, given for example purposes, without any limitations, while referring to the drawings appended on which:

FIG. 1 is a schematic view of an automotive vehicle steering column transmission of a well-known assembly;

FIG. 2 is a schematic view of a set of steering columns including an elastic coupling unit according to an embodiment of the present invention;

FIG. 3 is a cross-sectional view of an elastic coupling unit according to an embodiment of the present invention;

FIG. 3a is an embodiment of an elastic portion of the elastic coupling unit shown in FIG. 3; and FIG. 4 is a cross-sectional view taken at section IV—IV of FIG. 3;

DETAILED DESCRIPTION

Figure 5:
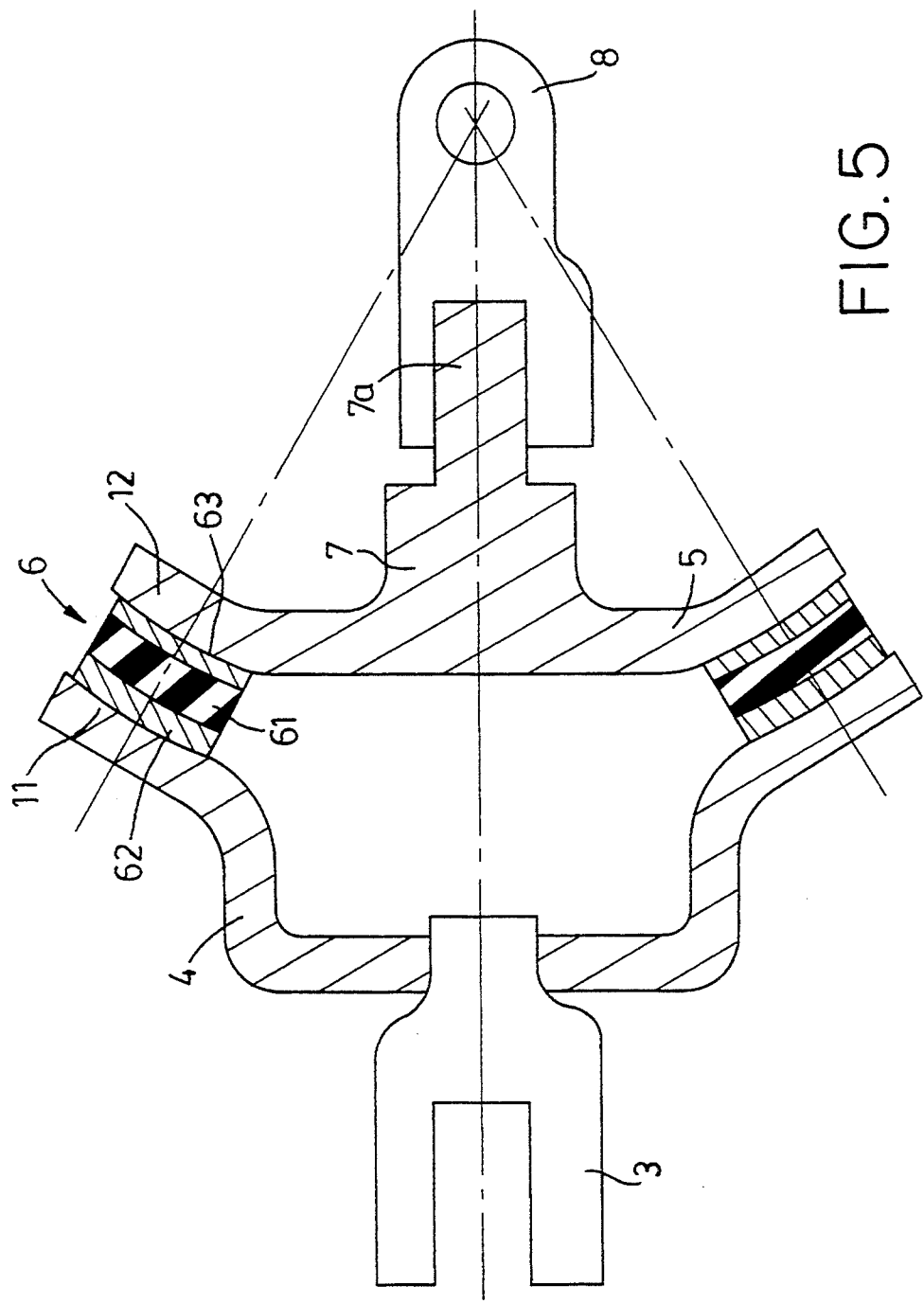
FIG. 5 is a schematic view of a portion of an elastic coupling unit according to another embodiment of the present invention.

With reference to FIG. 2, an elastic coupling unit according to the invention is arranged on an element of a motion transmission assembly, having at least one cardan joint 8 on one of its ends. This elastic coupling unit is more especially mounted on an automotive vehicle steering column, as shown on FIG. 2. In this type of transmission, the elastic coupling unit is arranged between the steering box and the cardan joint 8. A second element of the transmission consists of an intermediate axle 9, one extremity of which is the cardan joint 8, and the other extremity of which is the cardan joint 10 connected to the driver's steering wheel. The elastic coupling unit includes an input plate 4 and an output plate 5, between which an elastic portion is located, working together with both these plates 4 and 5. The input plate 4 includes a flange 3 connected to the pinion 2 of the steering box driven by the rack 1. The output plate 5 includes a flange 7, connected to the cardan joint 8.

In order to specify the exact position of the conical rotation center of the assembly, the elastic portion 61 the annular face portion of the input plate 4 and the peripheral portion of the output plate 5, are concave in shape. The peripheral portions of the input and output plates are located on opposite sides of the elastic portion 6. The elastic portion 6 works together with the annular face portion of the input plate 4 and with the annular face portion of the output plate 5, and the concavity center of these different portions matches the conical rotation center of the assembly. Moreover, the concavity center is located on the output plate 5 side in the area of center of the cardan joint 8, and ideally exactly in this center.

In the embodiment shown in FIGS. 2 and 3, the annular face portion of the input plate 4, the annular face portion of the output plate 5 and the elastic portion 6 with which both of the annular face portions work are substantially plane and conical in shape. The conical shapes of the assembly are selected so that the different sections have a concave shape whose concavity center is more or less the conical rotation center of the assembly, i.e. the center of the cardan joint 8.

While remaining within the framework of the invention, according to another embodiment, as seen in FIG. 5, the annular face portion of the input plate 4, the annular face portion of the output plate 5 and the elastic portion 6 with which both these portions work are more or less in the form of a spherical portion. The size of this spherical portion is established to be concave in the concavity center and corresponding more or less to the conical rotation center of the assembly.

According to a first embodiment not shown, the elastic portion 6 solely consists of an elastic material which contact directly to the internal side of the input plate 4 and the external side of the output plate 5.

According to another embodiment shown in FIG. 3, the elastic portion 6 includes one element formed of elastic material 61 and an intermediate plate 62. The element formed of elastic material 61 contact directly the external side 12 of the output plate 5 and the intermediate plate 62. The intermediate plate 62 bears against the internal side 11 of the input plate 4. The intermediate plate 62 is connected to the input plate 4 using assembly means such as rivets 13. The rivets 13 extend through the input plate 4, the elastic portion 6 and the output plate 5.

According to a third embodiment show in FIGS. 3a, the elastic portion has one element formed of elastic material 61 and an intermediate plate 63. The element formed of elastic material 61 contact directly the internal side 11 of the input plate 4 and the intermediate plate 63. The intermediate plate 63 bears, in turn, against the external side 12 of the output plate 5. The intermediate plate 63 is connected to the output plate 5 using assembly means such as rivets 13. The rivets 13 extend through input plate 4, the elastic portion 6 and the output plate 5.

A fourth embodiment of the elastic portion is shown schematically in FIG. 2. The elastic portion 6 has one element formed of elastic material 61 and two intermediate plates 62 and 63, which are arranged on both sides of this elastic element 61. The element formed of elastic material 61 contacts directly the intermediate plate 62 and the intermediate plate 63. The intermediate plate 62 bears against the internal side 11 of the input plate 4, and the intermediate plate 63 bears against the external side 12 of the output plate 5. Each of the intermediate plates 62 and 63 are then connected respectively to the input plate 4 and to the output plate 5 using assembly means, such as the rivets 13 shown in FIGS. 3 and 3a. These rivets go through the input plate 4, the elastic portion 6 and the output plate 5.

As can be seen in FIG. 2, the elastic coupling unit according to the invention is mounted on an automotive vehicle steering column and includes an input plate 4 which comprises a flange 3 connected to the pinion 2 of the steering column, which is in turn driven by the rack 1. The output plate 5 includes a flange 7 connected to the jaw of the cardan joint 8, such as by a rod 7a.

According to the embodiment shown in FIGS. 3 and 4 the input plate 4 has a flange 3 mounted inside this plate, and which has the shape of a partially split hub in the axial direction. The portion of the hub which is split is situated outside the linking area of the hub with the input plate 4. The axial slot arranged on this hub enables producing both parts 15 and 16 of a claw. Both these parts 15 and 16 are blocked against the pinion shaft 17 of the steering box as can be seen in FIG. 4 also. An assembly screw goes through a passing hole 18 drilled through the portion 15 in order to engage into a tapped hole arranged in the portion 16. Moreover, in the plane of this assembly screw, the shaft 17 of the pinion 2 of the steering box exhibits a circular groove, so that the assembly screw is secant to this shaft 17.

The shaft 17 of the pinion 2 of the steering box also possesses two flat surfaces, 19, which work together with two shapes 20 carved in the flange 3 and which have a conjugated shape with these two flat surfaces 19. Thus, the position of the shaft 17 of the pinion 2 of the steering box is perfectly connected in rotation with the flange 3 of the input plate 4 of the elastic coupling unit.

The output plate 5 has the flange 7, whose extremity consists of a rod 14 which engages into the jaw of the cardan joint 8 to which it is connected.

In the whole description of the invention described above, by output plate we mean the plate located on the affected cardan joint side, i.e., the closest plate to this cardan joint. One should also be aware according to the invention, the elastic coupling unit can be situated on another element of the steering column, i.e., between two cardan joints or between the steering wheel and the upper cardan joint.

Another embodiment of the invention not represented on the figures relates to an elastic coupling unit designed to have solely the output plate 5 of concave shape, i.e., the plate located on the affected cardan joint side. In such a case, the elastic portion 6 has only one concave shape, i.e., only one side of concave shape which is the one working together with the annular face portion of the output plate 5, i.e., the external side 12 of the output plate 5. While this invention has been illustrated and described in accordance with a preferred embodiment, it is recognized that variations and changes may be made therein without departing from the invention as set forth in the claims.

What is claimed is:

1. An elastic coupling unit adapted for use in a motion transmission assembly including an input and an output portion and a cardan joint connected to the output portion, the coupling unit comprising:
   an input plate disposed proximate the input portion of the motion transmission assembly, the input plate having an annular face portion;
   an output plate disposed proximate the output portion of the motion transmission assembly, the output plate including a convex annular face portion; and
   an elastic member disposed between the input plate and the output plate, inner and outer annular face portions of the elastic member being connected to the annular face portions of the input and output plates, respectively, the outer annular face portion of the elastic member being concave and connected to the annular face portion of the output plate,
   wherein concavity centers of the outer annular face portion of the elastic member and the annular face portion of the output plate match one another.

2. The elastic coupling unit as set forth in claim 1, wherein the concavity centers of the outer annular face portion of the elastic member and the annular face portion of the output plate correspond to a conical rotation center of the motion transmission assembly.

3. The elastic coupling unit as set forth in claim 2, wherein the conical rotation center of the motion transmission assembly is at a pivot center of the cardan joint.

4. The elastic coupling unit as set forth in claim 1, wherein the annular face portion of the input plate is concave and the inner annular face portion of the elastic member connected to the annular face portion of the input plate is convex and concavity centers of the inner annular face portion of the elastic member and the annular face portion of the input plate match one another.

5. The elastic coupling unit as set forth in claim 4, wherein concavity centers of the inner annular face portion of the elastic member and the annular face portion of the input plate correspond to the conical rotation center of the motion transmission assembly.

6. The elastic coupling unit as set forth in claim 5, wherein the conical rotation center of the motion transmission assembly is at a pivot center of the cardan joint.

7. The elastic coupling unit as set forth in claim 4, wherein the concavity centers of the annular face portion of the input plate, the inner and outer annular face portions of the elastic member, and the annular face portion of the output plate match one another.

8. The elastic coupling unit as set forth in claim 1, wherein the outer peripheral portion of the elastic member and the peripheral portion of the output plate are substantially spherical in cross-section.

9. The elastic coupling unit as set forth in claim 1, wherein the elastic member is formed entirely of an elastic material and the elastic material of the elastic member contacts both the input and the output plates.

10. The elastic coupling unit as set forth in claim 1, further comprising at least one intermediate plate disposed between at least one of the annular face portion of the input plate and the inner annular face portion of the elastic member and the annular face portion of the output plate and the outer annular face portion of the elastic member.

11. The elastic coupling unit as set forth in claim 10, further comprising assembly means for connecting the at least one intermediate plate to the input plate, the elastic member, and the output plate.

12. The elastic coupling unit as set forth in claim 11, wherein the assembly means includes one or more rivets extending through the input plate, the elastic member, the output plate, and the at least one intermediate plate.

13. An automotive vehicle steering column assembly, comprising:
a motion transmission assembly, the motion transmission assembly including an input and an output portion and a cardan joint connected to the output portion;
an elastic coupling unit, including
an input plate disposed proximate to the input portion of the motion transmission assembly, the input plate having an annular face portion,
an output plate disposed proximate to the output portion of the motion transmission assembly, the output plate including a convex annular face portion, and
an elastic member disposed between the input plate and the output plate, inner and outer annular face portions of the elastic member being connected to the annular face portions of the input and output plates, respectively, the outer annular face portion of the elastic member being concave and connected to the annular face portion of the output plate,
wherein concavity centers of the outer annular face portion of the elastic member and the annular face portion of the output plate match one another.

14. The automotive vehicle steering column as set forth in claim 13, further comprising a steering box including a pinion having a shaft, wherein the input plate further includes a flange connected to the shaft of the pinion and wherein the output plate further includes a flange fitted with a rod connected to a jaw of the cardan joint.

15. An automotive vehicle steering column as set forth in claim 14, wherein the flange of the input plate includes a hub portion in which the shaft of the pinion is blocked.

16. An automotive vehicle steering column as set forth in claim 15, further comprising means for opening and closing the hub portion around the shaft of the pinion.

17. An automotive vehicle steering column as set forth in claim 16, wherein the opening and closing means includes an axial split formed in the hub portion such that the hub portion forms a pair of claws surrounding the shaft of the pinion and an assembly screw passing through holes formed in portions of the claws such that turning the screw in one direction causes the hub portion to open and turning the screw in an opposite direction causes the hub portion to close.

18. An automotive vehicle steering column as set forth in claim 17, wherein the assembly screw is secant to the shaft of the pinion.

19. An automotive vehicle steering column as set forth in claim 14, further comprising means for preventing rotation of the shaft of the pinion relative to the flange of the input plate.

20. The automotive vehicle steering column as set forth in claim 19, wherein the rotation preventing means includes a non-circular exterior surface on the shaft and a corresponding, non-circular, shaft-receiving interior portion of the flange of the input plate.

21. An elastic coupling unit adapted for use in a motion transmission assembly including an input and an output portion and a cardan joint connected to the output portion, the coupling unit comprising:
an input plate disposed proximate the input portion of the motion transmission assembly, the input plate having an annular face portion;
an output plate disposed proximate the output portion of the motion transmission assembly, the output plate including a protruding cone-shaped annular face portion; and
an elastic member disposed between the input plate and the output plate, inner and outer annular face portions of the elastic member being connected to the annular face portions of the input and output plates, respectively, the outer annular face portion of the elastic member being a recessed cone shape and being connected to the annular face portion of the output plate,
wherein slants of the outer annular face portion of the elastic member and the annular face portion of the output plate match one another.

22. The elastic coupling unit as set forth in claim 21, wherein lines perpendicular to the annular face portion of the elastic member and the annular face portion of the output plate intersect substantially at a pivot center of the cardan joint.

* * * * *